United States Patent [19]

Anderson

[11] 4,342,524
[45] Aug. 3, 1982

[54] MATERIAL FASTENING STRUCTURE AND METHOD

[76] Inventor: Richard N. Anderson, P.O. Box 1613, Owensboro, Ky. 42301

[21] Appl. No.: 153,946

[22] Filed: May 28, 1980

[51] Int. Cl.³ .............................................. F16B 2/00
[52] U.S. Cl. ................................... 403/331; 403/374; 403/381; 285/67; 285/325
[58] Field of Search ............... 403/260, 264, 280, 281, 403/255, 277, 381, 409, 374, 363, 331; 256/65, 70; 285/67, 325

[56] References Cited

U.S. PATENT DOCUMENTS

| | | | |
|---|---|---|---|
| 3,317,227 | 5/1967 | Nijhuis | 403/231 |
| 3,498,589 | 3/1970 | Murdock | 256/70 |
| 4,050,828 | 9/1977 | Noro | 256/65 X |
| 4,083,641 | 4/1978 | Sado | 403/260 |
| 4,260,278 | 4/1981 | Yartz | 403/260 |

Primary Examiner—Andrew V. Kundrat
Attorney, Agent, or Firm—Whittemore, Hulbert & Belknap

[57] ABSTRACT

A compression member positioned against a member to which other material is to have an opening therethrough and fastening means extending through the openings in the compression member into engagement with a surface of the member to which other material is to be fastened under compressive force applied by the compression member for securing the other material to the member to which other material is to be fastened. The member which other material is to be fastened is secured to the other material by the method of placing the compression member adjacent the member to which other material is to be fastened and placing the fastening means between the compression member and the member to which other material is to be fastened under compression from the compression member.

6 Claims, 16 Drawing Figures

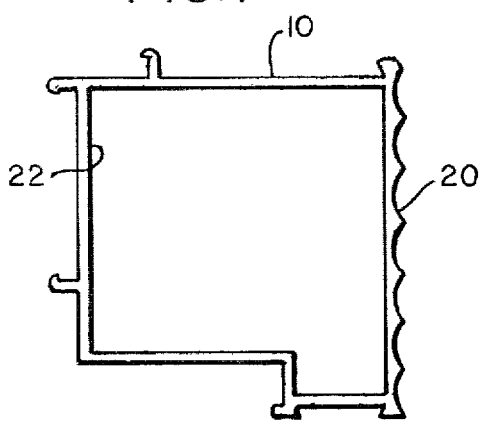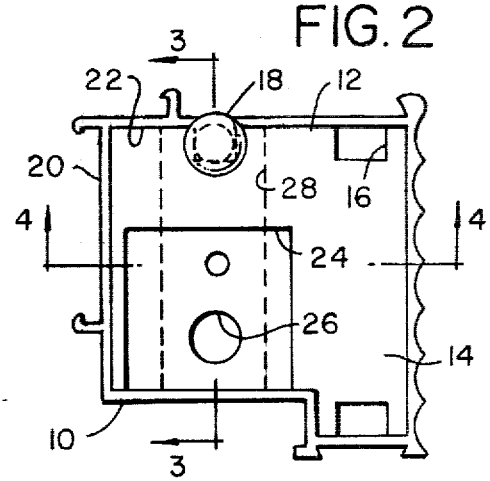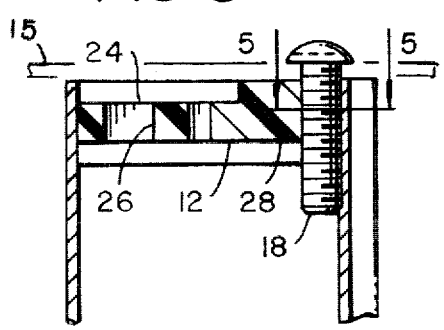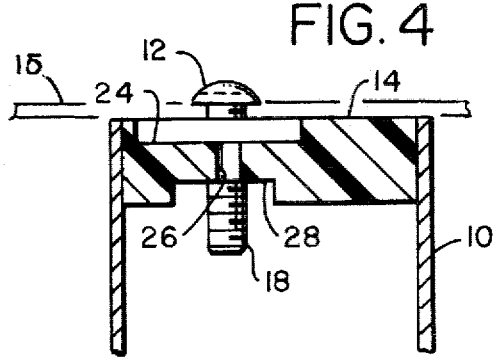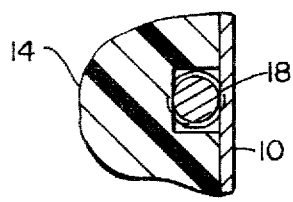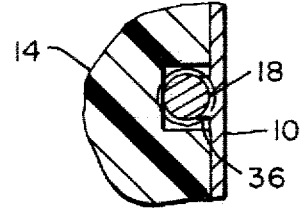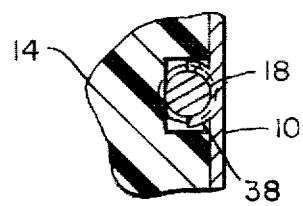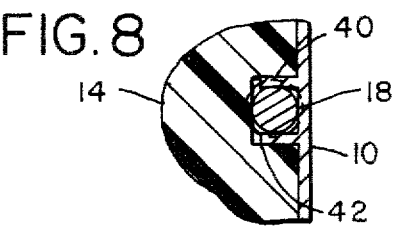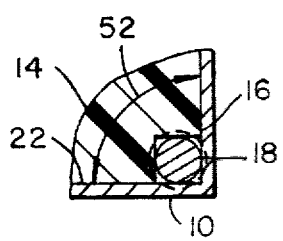

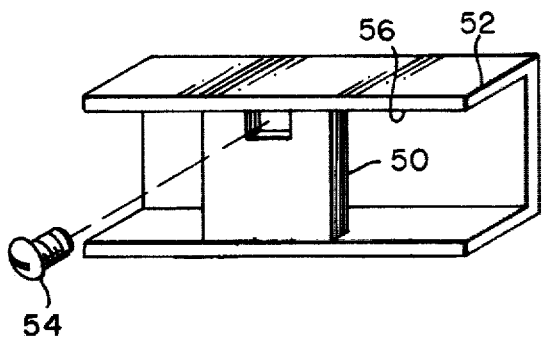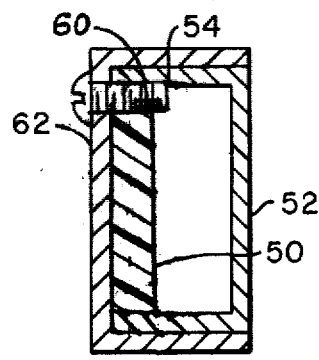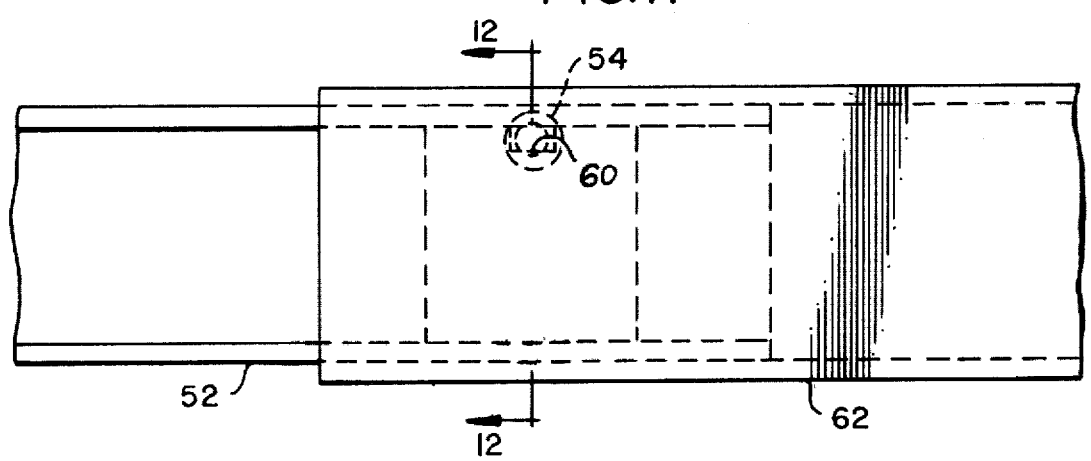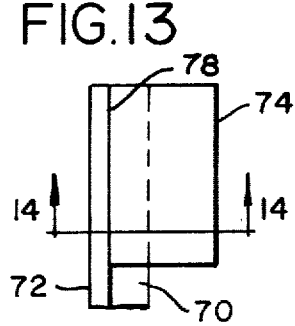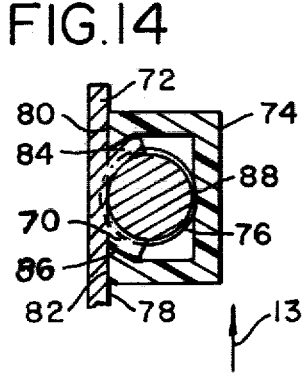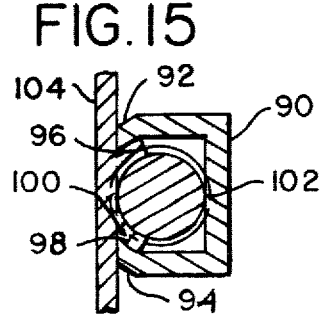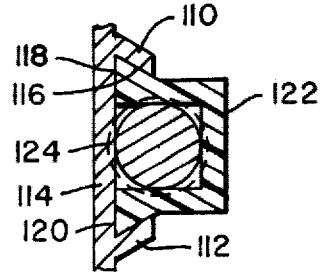

MATERIAL FASTENING STRUCTURE AND METHOD

BACKGROUND OF THE INVENTION

1. Field of the Invention

The invention relates to fastening devices and refers more specifically to structure for and a method of fastening a member to other material by means of a compression member positioned adjacent one surface of the member having an opening at the surface of the member and fastening means inserted in the opening in the compression member engaging the surface of the member under compression.

2. Description of the Prior Art

In the past, when joining a member such as an aluminum extrusion to other material such as another aluminum extrusion, for example, screw runners have often been provided extruded simultaneously with one of the extrusions, whereby fastening of the two extrusions together has been accomplished by screws extending transversely through the other of the extrusions positioned perpendicularly to the one extrusion having the screw runners therein and into the screw runners of the one extrusion.

Typically, screw runners provide problems for extruders, since the throat, that is, the longitudinally extending opening of the screw runners have to be relatively narrow to contain a screw. This means that an extrusion die is weakened in the area of the screw runners. Usually, dies with screw runners in them are destroyed and have to be replaced long before they are worn out because a screw runner tab breaks out. Extrusion die life would on the average be more than doubled if screw runners could be eliminated.

One possible means of extending such die life may be to straighten out the generally arcuate legs of screw runners and subsequently to swedge them over in a fabricating operation at the ends of an extrusion only so that the screw runner takes a containment profile only at the end of the extrusion where screws are actually used. There are disadvantages to this approach in that an extra fabricating operation is required at each end of an extrusion and the screw runner still does not present an ideal situation in that the throat of the screw runner has been increased which initially appears to improve the die life but at the same time the length of the legs have been increased, which tends to reduce die life. The increased leg length tends to offset the advantage of a wider screw runner throat.

Another disadvantage to the typical screw runner utilizes in the past is that many times when a screw runner in a die starts to wear, or when there is any deviation in an extrusion which tends to make the inside diameter of the screw runner undersized or to slightly open the throat, or to mislocate the screw runner slightly, then in the assembly process a screw tends to be led out of the screw runner as it first enters the screw runner. The result of such wear and subsequent fabrication is a weak and ineffective joint which a fabricator never knows about until a produce fails after it is installed, since most such fastenings in fabrication are blind.

Also, some assemblies cannot use screw runners for fastening members to other material effectively because of the material used such as steel or because of other constraints such as wall thickness. For these and other applications, concealed fasteners might be desirable but have in the past sometimes been considered impossible on economic or efficiency grounds. Such assemblies have sometimes been fastened together with high strength brackets separately secured to each member to be joined.

SUMMARY OF THE INVENTION

In accordance with the present invention, there is provided a fastening structure and method for securing a member to other material without fabrication of the member. While the present invention eliminates screw runners or substantially reduces the requirements of screw runners, it may have its greatest application in structures not normally including screw runners, since it may be utilized in structures wherein extruding screw runners is not possible.

The structure of the invention comprises a compression member which may be in the form of a plate held in compression adjacent one surface of a member to be fastened to other material, which plate has an opening therethrough at the surface of the member to be fastened, and fastening means, as for example, a screw positioned in the opening in the plate in engagement with one surface of the member to be fastened under compression forces applied thereto through the plate.

In addition, a modified screw runner of, for example, 90° or 180° of arc, or having straight legs of slightly greater extent than the radius of the fastening means may be provided on the one surface of the member to be fastened at the opening through the plate for receiving the fastening means. Alternatively, the member to be fastened may have an included angle of less than 180° on the one surface thereof, and the opening in the plate may be located at the included angle whereby the fastening means engages the surface of the material to be fastened under urging of the plate at the included angle.

Generally, the structure of the invention includes a compression member positioned in any manner on a member to which other material is to be fastened, whereby the compression member is placed in compression with respect to at least one surface of the member. An appendage or two may thus be utilized with the normal configuration of a member such as a flat surface or an angle to hold a compression member adjacent a desired member surface. Alternatively, the configuration of a member may be used by itself to hold a compression member in a desired location.

Thus, for example, a compression plate may be placed in the opening between the ends of the legs of a channel member whereby the fastening means will extend perpendicularly to the channel. Thus, in accordance with the structure of the invention, a telescoping channel structure is possible with but a single opening extending through one channel member.

In a further embodiment of the structure of the invention, a compression member, which is U-shaped in cross section, engages a partial screw runner or the like on a surface of a member to which other material is to be attached. In such embodiment of the invention, the compression member is held by the screw runner itself to provide compression on a screw positioned between the compression member and the modified screw runner. In this embodiment of the invention, the compression member may have flared ends to cooperate with the outer surface of a modified screw runner to hold the compression member in place. Alternatively, the compression member may be made of malleable material, the ends of which may be crimped under the outer edges of a modified screw runner. In a third modification of this embodiment of the invention, the compression member may have flared ends thereon which are complementary to a dovetail opening formed by projections extending toward each other in spaced relation on the surface of the member to which other material is to be attached.

The method of the invention includes providing a member under compression adjacent a surface of a member to be fastened to other material having an opening therethrough at one surface of the member and positioning fastening means between the surface of the member to be fastened and the compression member under compression from the compression member. The fastening means may be positioned in a modified screw runner on the one surface of the material to be fastened or at an included surface angle of less than 180°.

The method of the invention further includes positioning a compression member on a surface of a member to which other material is to be fastened in any manner wherein the compression member is maintained on the member to which other material is to be attached while providing a compressing force against fastening means positioned between the compression member and the surface of the member to which other material is to be fastened.

The method of the invention further includes providing generally U-shaped compression members having their ends secured at a surface of a member to which other material is to be fastened by a modified screw runner or the like. In such method, the compression member may be placed in tension or in compression with regard to the modified screw runner and/or may be malleable and physically deformed to engage the screw runner.

BRIEF DESCRIPTION OF THE DRAWINGS

FIG. 1 is an end view of a member to be fastened to other material, in accordance with the structure and method of the invention.

FIG. 2 is an end view of the member to be fastened shown in FIG. 1, with the fastening structure of the invention shown utilized therewith, in accordance with the method of the invention.

FIG. 3 is a partial section view of the member to be fastened with the fastening structure of the invention utilized therewith, as shown in FIG. 2, taken substantially on the line 3—3 in FIG. 2 and showing material to be fastened to the member in phantom.

FIG. 4 is a partial section view of the member to be fastened with the fastening structure of the invention utilized therewith, as shown in FIG. 2, taken substantially on the line 4—4 in FIG. 2 and showing material to be fastened to the member in phantom.

FIG. 5 is an enlarged section view of the structure illustrated in FIG. 2, taken substantially on the line 5—5 in FIG. 3.

FIG. 6 is an enlarged section view similar to FIG. 5 of modified structure such as illustrated in FIGS. 1-5, showing a screw runner included on the member to be fastened having an arc of approximately 90°.

FIG. 7 is an enlarged section view similar to FIG. 5 of modified structure such as illustrated in FIGS. 1-5, showing a screw runner included on the member to be fastened having an arc of approximately 180°.

FIG. 8 is an enlarged section view similar to FIG. 5 of modified structure such as illustrated in FIGS. 1-5, showing a screw runner having straight legs extending over slightly more than the radius of the fastening means included on the member to be fastened.

FIG. 9 is an enlarged section view similar to FIG. 5 of modified structure such as illustrated in FIGS. 1-5 wherein the member to be fastened has a surface with an included angle of less than 180° at the fastening means.

FIG. 10 is a perspective view of a second embodiment of the fastening structure of the invention utilized in accordance with the method of the invention in conjunction with a channel member.

FIG. 11 is a plan view of telescoping channel structure utilizing the fastening structure and method of the invention as shown in FIG. 10.

FIG. 12 is a section view of the channel structure shown in FIG. 11, taken substantially on the line 12—12 of FIG. 11.

FIG. 13 is an elevation view of a third embodiment of the invention for practicing the method of the invention, taken in the direction of arrow 13 in FIG. 14.

FIG. 14 is a cross section of the embodiment of the invention illustrated in FIG. 13, taken on the line 14—14 of FIG. 13.

FIG. 15 is a cross section view similar to the view of FIG. 14 of a first modification of the embodiment of the invention illustrated in FIGS. 13 and 14.

FIG. 16 is a cross section view similar to the view of FIGS. 14 and 15 illustrating a second modification of the embodiment of the invention illustrated in FIGS. 13 and 14.

DESCRIPTION OF PREFERRED EMBODIMENTS

The member to be fastened to other material with the fastening structure and by the fastening method of the invention, as shown in FIG. 1, is an aluminum extrusion 10 for use in producing sliding doors and the like. The extrusion 10 is shaped in cross section, as shown in FIG. 1, and in the embodiment shown in FIG. 1 includes no screw runners.

The fastening structure 12, as shown in FIGS. 2-5, in conjunction with the extrusion 10 includes the compression plate 14 and the fastening means 18 which is a screw.

The structure 12 is utilized in accordance with the method of the invention by placing the plate 14 having the openings 16 therethrough at the edge thereof in the end 20 of the extrusion 10 and threading the screw 18 through an opening 16, whereby it is forced into contact with the inner surface 22 of the extrusion 20 under a compressive force applied thereto by the plate 14.

More specifically, the extrusion 10 may be an aluminum extrusion of approximately 1¼"×1¾" in a generally rectangular configuration as shown having approximately 1/16" thick walls. There is no intention to limit the material or dimensions of the extrusion 10. Also, the configuration of the extrusion 10 is not part of the invention. The extrusion 10 is shaped as shown for other purposes in the structure for which it is intended.

The plate 14 may be an injected molded plastic plate approximately ¼" thick, for example. The thickness of plate 14 is largely determined by the compressive strength of the plate material. The plate may therefore be a minimal thickness determined by the material of which it is constructed.

Plate 14 includes the three openings 16 therethrough at the edges thereof adjacent the inner surface 22 of the extrusion 10 which would normally have screw runners thereon extending longitudinally thereof to assist in the securing of other materials 15 to the extrusion member 10. Portions of plate 14 not necessary to guide the fastening means 18 and provide compressive forces thereon may be removed as desired for purposes of economy.

The plate 14 may also have a configuration to enable it to perform additional functions other than fastening in an assembled structure. Thus, as shown particularly in FIG. 2, the plate includes the top recess 24 and openings 26 therein to receive a top roller construction for a door. Also, a recess 28 is provided in the bottom of the plate to aid in securing the bottom rollers of a door thereto. Thus, the plate 14 may be used at the ends of door rails, as desired, to aid in fastening door stiles to the rails as well as to aid in securing top and bottom rollers to the assembled door.

In securing a member such as a door stile to a top rail, in accordance with the method of the invention, the door stile would have screw openings passing transversely therethrough in the usual manner through which screws may be inserted. Such screws usually extend into screw runners in the top rail. In the present invention, the screws 18 would extend through the other material 15 to be fastened to the extrusion member 10 and would extend through the openings 16 and would engage the inside wall 22 of the extrusion 10 under a compressive force provided by the plate 14 positioned within the end of the extrusion 10. The screw 18 would thus cut threads in the inside wall 22 of the extrusion 10 and would be held in predetermined axial position by the sheer strength of the screw threads over the arc in which they are engaged with the extrusion 10 on the surface 22.

A tight, secure joint between a member and material to be fastened thereto may thus be accomplished by the fastening structure 12 of the invention including the plate 14 and the screw 18 utilized in conjunction with a member to be fastened without the requirement of screw runners in the member to be fastened.

If a greater area of containment between the screw 18 and extrusion 10 is desired, the extrusion 10 may be modified as shown best in FIG. 6, whereby a modified screw member 36 having an extension of 90° of arc is provided on the surface 22 of the extrusion 10. Such screw runner 36 greatly increases the gripping ability of the screw 18 under compression of the plate 12 at the opening 16 therein. With approximately five percent of the amount of material normally used in screw runners, approximately 50% of the holding value of a complete screw runner is accomplished with the 90° arc of the screw runner 36 shown in FIG. 6.

If even greater holding ability is required with the structure of the invention, a screw runner 38 with approximately 180° of arc may be provided on the surface 22 of the extrusion 10, as shown in FIG. 7, in alignment with the openings 16 in the plate 14. Such 180° screw runner can be manufactured with approximately ten percent of the material of previous screw runners and will produce 100% of the previous screw runner holding ability.

In a further modification of the invention as shown in FIG. 8, the arcuate nature of the screw runner may be eliminated altogether and straight legs 40 and 42 used instead. The tabs 40 and 42 in the modified extrusion 10 shown best in FIG. 8 extend to slightly greater than the radius of the fastening means or screw 18 as shown and provide substantially 100% of the holding power of previous screw runners. The legs 42 and 42 may be very thin and are supported laterally by the plate 14.

In a further modification of the invention shown in FIG. 9, the extrusion 10 is shown to have an included angle 52 with the surface 22 with the opening 16 in the plate 14 positioned at the included angle. The fastening means 18 is then positioned in the opening 16 at the included angle 52 to engage the portions of the surface 22 defining the included angle to effect the fastening of the member 10 to other material, as before.

In the embodiment of the invention shown in FIG. 10, the compression member or plate 50, which in all respects may be like the plate 14, is utilized in conjunction with a channel section 52, which again may be of extruded aluminum, steel or plastic, to permit ready connection thereto of other material by means of the screw 54, substantially as before. Again, the screw 54 may be utilized in conjunction with plate 50 and channel surfaces 56. Alternatively, the channel surfaces 56 may be provided with configurations such as any of the configurations of FIGS. 6, 7 and 8, although as shown, such configurations cannot be extruded in the channel 52 extending other than axially thereof.

Thus, as shown best in FIG. 10, it will be readily apparent that the structure of the invention including the plate 50 and screw 54 can be utilized in accordance with the method of the invention to connect material to a member such as the channel member 52 by means of screw 54 extending transversely of the member as well as axially thereof. The material may be flat or may have another configuration such as the channel shown in FIGS. 11 and 12. The fastening structure and method of the invention is therefore more versatile than the ordinary screw runner structure which cannot normally be provided extending transversely of the longitudinally extending axis of an extrusion.

Fastening structure such as that shown in FIG. 10 permits a variety of useful structural assemblies. Thus, for example, as shown in FIGS. 11 and 12, telescoping channels may be readily provided but with a single opening 60 in one of the channels 62 and 52. Again, the plate 50 is held in position at any required adjustable location along the channel 52 by the screw 54 to provide the proper extension of the larger channel 62 also having the screw 54 extending through the opening 60.

The embodiment of the invention illustrated in FIG. 13 suggests the further versatility of the fastening structure and method of the invention. Thus, the structure in FIGS. 13 and 14 includes a partial screw runner 70 extruded or otherwise formed on the surface of a member 72 to which other material is to be fastened, operable in conjunction with a compression member 74 which is similar to the plates 14 and 50 in function and the fastening means or screw 76.

The compression member 74 is shaped in cross section as shown in FIG. 14 and extends for a short distance along the length of one surface 78 of the member 72. The U-shaped compression member 74 is provided with the wedge-shaped terminal portions 80 and 82 which are complementary to the surfaces 84 and 86 of the partial screw runner 70.

Further, the dimension of the compression member 74 is such as to provide slight compression between the portions 80 and 82 of the compression member 74 and the surfaces 84 and 86 of the partial screw runner 70. Thus, the compression member 74 is securely held on the partial screw runner 70 with tension in the connecting portion thereof and again provides a surface against which screws 88 are placed in compression to be held in contact with the partial screw runner 70.

In the modified structure of FIG. 15, the U-shaped compression member 90 is made of malleable material and the terminal ends 92 and 94 are crimped over the ends 96 and 98 of the partial screw runner 100. Again, a screw 102 may then be used to secure material to the member 104 in the manner considered in the discussion of the embodiment of the invention shown in FIGS. 13 and 14.

A further modification of the embodiment of the invention shown in FIGS. 13 and 14 as shown in FIG. 16 includes a pair of projections 110 and 112 on a member 114 to which other material is to be secured. The projections 110 and 112 may be extruded along with the member 114 and form a dovetail opening 116 for receiving the flared portions 118 and 120 of the compression member 122. The compression member 122 may again be made of an injection molded plastic. The member 122 is utilized mainly in compression, whereas the member 74 is placed in tension in some areas. Again, the compression member 122 extends only a short distance along the projections 110 and 112 to receive a screw 124 which may be utilized to secure the other material to the member 114, as before.

While a number of embodiments of the invention and modifications thereof have been considered in detail herein, it will be understood that other embodiments and modifications are contemplated by the inventor. Thus, for example, the material to be fastened to a member may be initially fastened to a member by the fastening means or it may be fastened to the member by being hung or otherwise positioned on the fastening member which need not be a screw at a later time. Also within the scope of the invention, the fastening means may be other than a screw. Thus, the fastening means need only be secured to the member by indentation or deformation of the member or by friction forces due to the compressive forces applied to the fastening means by the compression member. It is the intention to include all embodiments and modifications of the invention as are defined by the appended claims within the scope of the invention.

I claim:

1. Structure for fastening a first member having a surface and an edge to a second member comprising a U-shaped member having parallel extending leg portions with free outer ends and a connecting portion extending between the other ends thereof, means for securing the outer ends of the leg portions of the U-shaped member to the surface of the first member adjacent the edge thereof and fastening means positioned between the surface of the first member and the inside of the U-shaped member.

2. Structure as set forth in claim 1, wherein the means for securing the U-shaped member to the surface of the first member comprises a partial screw runner on the surface of the first member and wherein the outer ends of the leg portions of the U-shaped member fit over.

3. Structure as set forth in claim 1, wherein the U-shaped member is resilient and the dimension between the connection portion thereof and the surface of the first member with the U-shaped member in position on the first member is slightly less than the dimension of the fastening means in the same direction.

4. Structure as set forth in claim 1, wherein the means for securing the U-shaped member to the surface of the first member comprises projections on the first member extending outwardly of the surface of the first member engaged with the outside of the leg portions of the U-shaped member.

5. Structure as set forth in claim 3, wherein the fastening means is a threaded member in engagement with the inside of the leg portions of the U-shaped member and the connecting portion thereof.

6. A telescoping channel structure comprising a first channel member including spaced-apart parallel leg portions and a connection portion, a second channel member including spaced-apart parallel leg portions and a connecting portion with the connecting portion of the second channel member being of such dimension as to permit the leg portions of the second channel member to slidably engage the outside of the leg portions of the first channel member positioned within the second channel member with the leg portions of the channel members extending in opposite directions, a threaded bolt opening in the second channel member substantially aligned with the inside surface of one of the leg portions of the first channel member and a compression plate extending between the inside surfaces of the leg portions of the first channel member adjacent the outer end thereof and in surface to surface contact with the connecting portion of the second channel member with the channel members in assembly and having a recess in one side thereof, a bolt extending through said bolt hole and said recess, said recess being of slightly less depth than the diameter of the bolt, whereby the bolt is urged into contact with the one leg portion of the first channel member and the compression plate to secure the channels together in any desired relative longitudinal relation.

* * * * *